3,142,530
METHOD OF BLEACHING COTTON FABRICS WITH N,N'-DICHLORO - 2,5 - DIKETOPIPERAZINES
Michael Kokorudz, Southgate, Mich., assignor to Wyandotte Chemicals Corporation, Wyandotte, Mich., a corporation of Michigan
No Drawing. Filed May 4, 1961, Ser. No. 107,628
7 Claims. (Cl. 8—108)

This invention relates to new active chlorine compounds. In a further aspect, this invention relates to new solid organic germicidal and bleach compounds.

In recent years, considerable effort has been expended towards the development of new solid organic active chlorine compounds for use as bleaching agents and germicides. The various hypochlorites, such as sodium and calcium hypochlorite, which have been customarily used in the past, are injurious to the skin of the user, weaken fabric strength and are unstable. Therefore, new active chlorine compounds are being sought which are safe and convenient to use, as well as being stable and having effective antibacterial properties of available chlorine for germicidal use and high concentrations of available chlorine for bleaching uses. The organic active chlorine compounds have been found, in general, to be more stable than inorganic active chlorine compounds. Thus, recently some commercial acceptance has been given to organic active chlorine compounds such as dichlorocyanuric acid, trichloroisocyanuric acid and 1,3-dichloro-5,5-dimethylhydantoin. However, all of the organic active chlorine compounds known in the art have certain disadvantages and workers in the art are continuing their search for new and effective organic active chlorine compounds for use as bleachers and germicides.

Therefore an object of this invention is to provide a new and effective organic active chlorine compound useful as a bleach and germicide.

Another object of this invention is to provide a new germicidal composition incorporating a new organic active chlorine compound.

Still another object is to provide a new bleach composition incorporating a new organic active chlorine compound.

A further object is to provide a method of disinfecting materials with a new organic active chlorine compound.

A further object is to provide a method of bleaching cotton fabrics with a new organic active chlorine compound.

A still further object is to provide a new method for preparing an organic active chlorine compound useful as a bleach and germicide.

These objects and others have been accomplished in this invention by the discovery of new and effective organic active chlorine solid bleach and germicidal compounds corresponding to the formula:

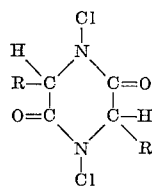

In the formula R is hydrogen or a methyl or ethyl radical. R may be the same or different in each occurrence in the formula. Thus the new organic active chlorine compounds of this invention are N,N'-dichloro-2,5-diketopiperazine, N,N'-dichloro-2,5-diketo-3-methylpiperazine, N,N'-dichloro-2,5,-diketo-3,6-dimethylpiperazine, N,N'-dichloro-2,5-diketo-3-ethylpiperazine, N,N'-dichloro-2,5-diketo-3,6-diethylpiperazine, and N,N'-dichloro-2,5-diketo-3-methyl-6-ethylpiperazine.

The new compounds are readily prepared in high yields as white solids which require little or no purification by the direct chlorination of the corresponding 2,5-diketopiperazine. The new compounds have been found effective as bleaches and, surprisingly, also extremely effective as germicides.

The new organic active chlorine compounds of the invention can be used in formulated bleaching or germicidal compositions by mixing in the substantially dry state with alkaline salts, such as sodium carbonate, sodium borate, sodium silicate, trisodium phospate, tetrasodium pyrophosphate, sodium triphosphate or mixtures of these. In addition, wetting agents, synthetic detergents generally, soaps, fillers, abrasives and water softening agents of the inorganic or organic type may be incorporated in bleach and germicidal compositions containing the new solid organic active chlorine compounds of the invention in order to impart special properties.

The new organic active chlorine compounds of the invention are characterized by a high degree of stability when dry and may be stored for long periods of time and transported over considerable distances with out substantial decomposition. When the new active chlorine compounds of the invention are dissolved in water, the ingredients of the mixture apparently react to yield hypochlorite chlorine which is responsible for the efficient oxidizing, bleaching, disinfecting and sterilizing action.

The new compounds of the invention are readily prepared as pure white solids in high yield and can be formed into tablets, sticks, cubes or agglomerates as well as in powdered form with or without the aforesaid alkaline salts and soaps, fillers, abrasives and water softening agents of the inorganic or organic type for use in bleaching and disinfecting operations.

The new organic active chlorine germicidal and bleach compounds of this invention are readily prepared by suspending a 2,5-diketopiperazine corresponding to the formula:

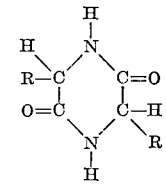

where R is hydrogen or a methyl or ethyl radical and may be the same or different in each occurrence in an aqueous solution having a pH of less than about 12.5, cooling the resulting mixture to below about 14° C. and passing chlorine gas into the cooled mixture, while maintaining the temperature at no more than about 30° C.

The 2,5-diketopiperazines corresponding to the aforesaid formula are prepared from the condensation reaction of 2 mols. of ethyl glycinate hydrochloride, alanine ethylester hydrochloride, α-amino butyric acid ethylester hydrochloride or from the condensation of 2 mols. of any combination of the aforesaid compounds as set forth in E. Fischer; Ber. 39, 2930 (1906).

The aqueous solution in which the chlorination is carried out can be alkaline, neutral, or acidic before the chlorination is commenced. The solution may be rendered alkaline or acidic by the use of any material which does not have an adverse effect resulting in the breaking of the ring structure of the starting material. This problem can generally be avoided if the pH is kept below about 12.5. Examples of suitable materials are sodium or potassium carbonate or bicarbonate and hydrochloric acid. However, ammonium salts should not be used because of the danger of forming nitrogen trichloride.

Good yields of the chlorinated diketopiperazine have been obtained when the diketopiperazine was suspended in water or in an aqueous alkaline solution having 2 mol. equivalents of sodium carbonate per mol. of diketopiperazine.

The temperature of the mixture while the chlorine gas is passed into the mixture is desirably about 0–30° C. and preferably should not be substantially above about 15° C.

Chlorine gas is passed in over a period of time in the range of about 0.5 to about 6 hours until the diketopiperazine is chlorinated. In the case where chlorination is carried out in an alkaline solution containing about 2 mol. equivalents of alkaline compound per mol. of diketopiperazine, chlorine gas is passed into the cooled mixture until the pH of the reaction mixture is in the range of 7–5, desirably about 6. It should be apparent that the chlorination is completed at a higher pH when higher concentrations of alkaline compound are employed. In the case of mixtures initially neutral, acidic, or slightly alkaline (containing less than 2 mol. equivalents of alkaline compound per mol. of diketopiperazine), the chlorine addition is stopped when the solution becomes noticeably yellow due to the termination of the diketopiperazine chlorination.

When the addition of chlorine gas is completed the white solid product is easily separated from the reaction mixture by filtration and air dried.

The new organic active chlorine compounds of this invention and the method by which they can be prepared are illustrated in the following examples which are intended to illustrate the invention without unduly restricting it.

*Example 1*

2,5-diketopiperazine was prepared by the condensation reaction of ethyl glycinate hydrochloride as set forth in E. Fischer; Ber. 39, 2930 (1906).

The new active chlorine compound of the invention, N,N'-dichloro-2,5-diketopiperazine was prepared by the chlorination of 2,5-diketopiperazine in an alkaline solution. The alkaline solution in which the chlorination was carried out was prepared by dissolving 70 grams (0.66 mol.) of $Na_2CO_3$ in 950 ml. of water. The aqueous sodium carbonate solution was cooled to 12° C. and 57 grams (0.5 mol.) of 2,5-diketopiperazine were added.

Chlorine gas was introduced to the aqueous alkaline solution of the 2,5-diketopiperazine while cooling the mixture so that the temperature was in the range of 12–14° C. Chlorine gas was passed into the alkaline solution over a period of about 5 hours until the pH was 6.0. The white solid product which was produced was filtered, air dried at room temperature and weighed.

A yield of 56 grams which was 62% of the theoretical amount of N,N'-dichloro-2,5-diketopiperazine, was obtained. Analysis of the product showed the product to have an active chlorine content of 34.7%, theoretical being 38.8%.

The active chlorine compound prepared was evaluated for germicidal activity using the Stuart-Ortenzio modification of the Cantor-Shelanski Increment Loading Method as is described in U.S. 2,957,915, column 3, lines 50–69.

The test for germicidal activity with the compound of the invention prepared in this example showed that the test organism was killed within the exposure time of 60 seconds at all increments of loading of 1 through 12 increments with the solutions having 100 and 200 parts per million of available chlorine. The killing of the test organism at all increments of loading of 1 through 11 increments was found with the solution of the compound of the invention having 50 parts per million concentration of available chlorine.

The test results illustrate that the chlorine compound prepared in this example is an excellent germicidal compound.

The chlorine compound prepared was also tested for bleaching activity by dissolving a sufficient quantity of the product in a liter of water so that the concentration of the product was sufficient to provide 200 parts per million of available chlorine. Deionized water was used to prepare the solution. The test procedure used was that described in U.S. 2,957,915, column 3, lines 16–40, using a Hunter Multi-Purpose Reflectometer.

The test of the active chlorine compound prepared in this example at 200 parts per million provided a bleached swatch which had a 65.0% reflectance at pH 4, 63.7% reflectance at pH 7, and 60.9% reflectance at pH 10. The results when compared to a reflectance of 50% for the unbleached swatch illustrate the bleaching characteristics of this active chlorine compound.

*Example 2*

The 2,5-diketopiperazine was prepared by the method of Example 1.

The new active chlorine compound of the invention, N,N'-dichloro-2,5-diketopiperazine was prepared by the chlorination of 2,5-diketopiperazine in water. Chlorine gas was introduced into the aqueous solution of the 2,5-diketopiperazine while cooling the mixture so that the tempertaure was maintained at 10° C. Immediately upon the introduction of chlorine gas the solution became acidic. Chlorine gas was passed into the solution over a period of 37 minutes at which time the reaction mixture was yellow. The white solid product which was produced was filtered, air dried at room temperature and weighed. A yield of 46 grams, which was 83% of the theoretical amount of N,N'-dichloro-2,5-diketopiperazine, was obtained. Analysis of the product showed the product to have an active chlorine content of 36.7%, theoretical being 38.8%.

It should be apparent that since the new organic active chlorine compounds of this invention are active germicidal agents they can be employed in aqueous germicidal rinse compositions in a sufficient amount in which to provide at least about 50 parts per million of available chlorine for use in disinfecting cooking and eating utensils, various structural surfaces, apparatus, furnishings and equipment, and likewise for washing natural products such as fruits and vegetables. It is also apparent that the new organic active chlorine compounds of this invention are useful as solid bleach compounds for bleaching cotton fabric.

The new compounds are, therefore, the basis for new methods and compositions for bleaching cotton fabrics and disinfecting materials employing these compounds as the active chlorine agent. Also, the new method by which the new organic active chlorine compounds have been prepared is considered as an embodiment of this invention.

I claim:

1. A method for bleaching cotton fabrics which comprises contacting said fabrics with an aqueous solution of a compound corresponding to the formula:

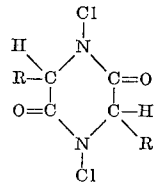

wherein R is a member selected from the group consisting of hydrogen, methyl and ethyl.

2. The method of bleaching according to claim 1 wherein said compound is N,N'-dichloro-2,5-diketopiperazine.

3. The method of bleacing according to claim 1 wherein said compound is N,N'-dichloro-2,5-diketo-3-methyl-piperazine.

4. The method of bleaching according to claim 1 wherein said compound is N,N'-dichloro-2,5-diketo-3,6-dimethylpiperazine.

5. The method of bleaching according to claim 1 wherein said compound is N,N'-dichloro-2,5-diketo-3-ethylpiperazine.

6. The method of bleaching according to claim 1 wherein said compound is N,N'-dichloro-2,5-diketo-3,6-diethylpiperazine.

7. The method of bleaching according to claim 1 wherein said compound is N,N'-dichloro-2,5-diketo-3-methyl-6-ethylpiperazine.

References Cited in the file of this patent

UNITED STATES PATENTS

| | | |
|---|---|---|
| 2,640,005 | Ligett et al. | May 26, 1953 |
| 2,647,121 | Jacoby | July 28, 1953 |
| 2,834,782 | Schlesinger et al. | May 13, 1958 |
| 2,863,800 | Gottfried | Dec. 9, 1958 |
| 2,980,488 | Kokorudz | Apr. 18, 1961 |
| 2,993,745 | Dorsett | July 25, 1961 |
| 3,002,975 | Slezak | Oct. 3, 1961 |

OTHER REFERENCES

Smith: Chem. Soc. Jour. (London), pt. 3, pp. 3985–8 (1957).

George et al.: Canadian Jour. of Chem., vol. 36, pp. 189–198 (1958).

Chem. Abstracts, vol. 52, p. 2750f (1958).